United States Patent
Lin et al.

(10) Patent No.: US 10,632,945 B2
(45) Date of Patent: Apr. 28, 2020

(54) METHOD AND APPARATUS FOR CONDITION TRIGGERED VEHICLE SETTING CONFIGURATION

(71) Applicant: FORD GLOBAL TECHNOLOGIES, LLC, Dearborn, MI (US)

(72) Inventors: Steven Lin, Ann Arbor, MI (US); Yifan Chen, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 196 days.

(21) Appl. No.: 15/639,568

(22) Filed: Jun. 30, 2017

(65) Prior Publication Data

US 2019/0001905 A1    Jan. 3, 2019

(51) Int. Cl.
*G06F 9/445* (2018.01)
*B60R 16/037* (2006.01)

(52) U.S. Cl.
CPC ........ *B60R 16/037* (2013.01); *G06F 9/44505* (2013.01); *G06F 9/4451* (2013.01)

(58) Field of Classification Search
None
See application file for complete search history.

(56) References Cited

U.S. PATENT DOCUMENTS

| 2014/0247348 A1* | 9/2014 | Moore, Jr. ............. G06F 17/00 348/148 |
| 2015/0126143 A1* | 5/2015 | Van Wiemeersch ... H04B 1/082 455/160.1 |
| 2015/0217777 A1* | 8/2015 | Konigsberg .......... B60W 50/08 701/36 |
| 2016/0191704 A1 | 6/2016 | Macinnes et al. |
| 2017/0052666 A1 | 2/2017 | Wang et al. |

* cited by examiner

*Primary Examiner* — Tamara L Weber
(74) *Attorney, Agent, or Firm* — Michael Spenner; Brooks Kushman P.C.

(57) ABSTRACT

A system includes a processor configured to receive a user-selected vehicle-detectable state and corresponding user-defined state-variable value. The processor is also configured to receive a user-defined vehicle-enactable action. The processor is further configured to save the state-variable value as a condition for enacting the vehicle-enactable action saved in conjunction with the state-variable value. The processor is additionally configured to monitor the vehicle-detectable state and enact the vehicle-enactable action upon determining via the monitoring that the vehicle-detectable state corresponds to the user-defined state-variable value saved in conjunction with the state-variable value.

7 Claims, 4 Drawing Sheets

METHOD AND APPARATUS FOR CONDITION TRIGGERED VEHICLE SETTING CONFIGURATION

TECHNICAL FIELD

The illustrative embodiments generally relate to methods and apparatuses for condition triggered vehicle setting configuration.

BACKGROUND

Smart phones represent an integral part of current human lives. While initially more of a convenience or novelty factor, these devices now warehouse our photo albums, keep us constantly connected with everyone we know, and provide us with nearly limitless on-demand information. As smart phones have improved, the ability to customize devices has improved as well. The typical model for a phone is one-phone one-person, so each person's customization of the device is usually persistent for any user.

Other electronic commodities are devices like tablets, laptops and desktop PCs. These devices also offer customization options, and the options are typically keyed to a login, since these devices tend to be shared by a number of users.

Finally, there are a class of customizable devices that are shared, but which have typically static settings. This could include home thermostats, home theater systems, and many mechanical devices around the house. While smart functionality can be incorporated into many of these devices in order to "recognize" a user, doing so would often involve a degree of technology that would make the device cost-prohibitive.

From all of these examples, it is clear that people like the idea of fine-tuning or making a device "theirs." And, since a lot of time and thought may have gone into a customization, people also like the idea of not having to re-customize a device each time they upgrade the device. This has been facilitated by the export/import of settings on smart phones and computers for some time. On the other hand, most other customizable devices require reconfiguration upon upgrade.

SUMMARY

In a first illustrative embodiment, a system includes a processor configured to receive a user-selected vehicle-detectable state and corresponding user-defined state-variable value. The processor is also configured to receive a user-defined vehicle-enactable action. The processor is further configured to save the state-variable value as a condition for enacting the vehicle-enactable action saved in conjunction with the state-variable value. The processor is additionally configured to monitor the vehicle-detectable state and enact the vehicle-enactable action upon determining via the monitoring that the vehicle-detectable state corresponds to the user-defined state-variable value saved in conjunction with the state-variable value.

In a second illustrative embodiment, a computer-implemented method includes automatically changing a vehicle system setting to match a user-defined setting value, responsive to a plurality of vehicle-detectable state values corresponding to user-defined state values, saved in conjunction with a predefined action defining both the state values as conditions for changing the vehicle system setting and the user-defined setting value.

In a third illustrative embodiment, a computer-implemented method includes connecting to a vehicle computer via a mobile device and requesting vehicle system data corresponding to a vehicle system state, the vehicle system state saved on the mobile device in conjunction with a user-defined vehicle-enactable action. The method also includes comparing the state data to a user-defined system state parameters, the parameters saved as a trigger for enacting the vehicle-enactable action and instructing the vehicle computer to enact the vehicle-enactable action when the state data matches the parameters based on the comparing.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
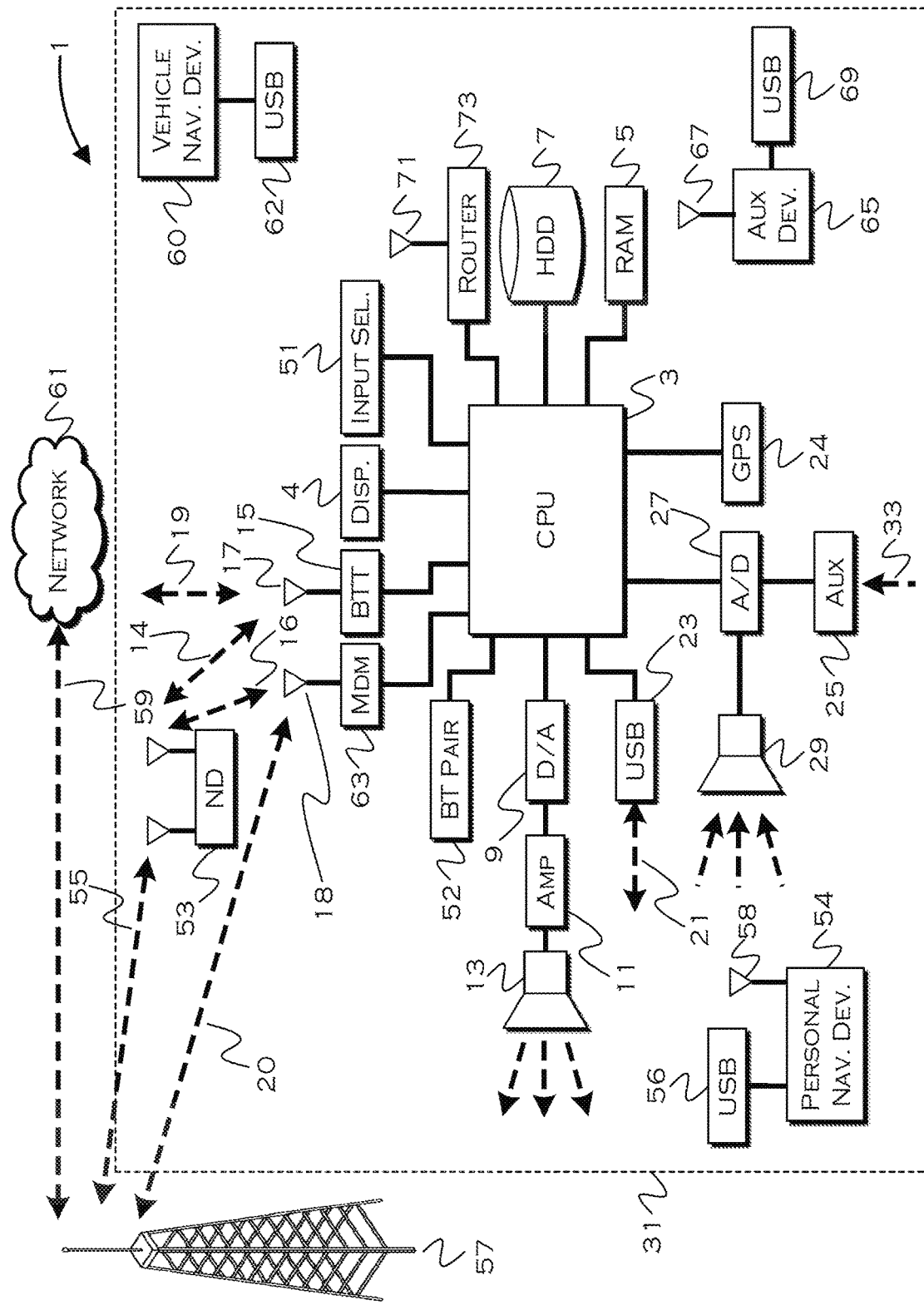
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a Wi-Fi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., Wi-Fi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

With all the customizable devices available to humans, perhaps the most expensive and one of the most customizable "devices" is an automobile. At roughly 50 to 100 times the cost of a phone or computer, these highly complex machines offer a wide range of user-configurable customization. Modern automobiles have the advantage of including both wireless communication technology and advanced internal computing technology. The coupling of these features lends itself to a highly customizable and even portable customization experience. While it has been possible to physically customize a vehicle for years, users do not typically attempt to take the same spoiler, for example, and affix it to every vehicle they drive. On the other hand, it might be more desirable for a user to have an electronic customization, such as radio settings, follow the user from vehicle to vehicle.

The world of automobile ownership may also be undergoing a paradigm shift, where users more frequently share vehicles with other users, and/or use short-term hourly rentals to use a vehicle for a simple daily task. In such an environment, absent portable customization features, it is highly unlikely a user will spend 10 minutes of a 1 hour rental configuring a vehicle to that user's preferences. Accordingly, one aspect of the illustrative embodiments includes a set of portable customization features that can follow a user from one vehicle to another.

A further challenge with vehicle customization is that vehicles are already highly specialized even before customization. Different makes and models, even from the same manufacturer, may have internal controls in different locations. In such instances, most short-term users may spend a few seconds searching for a desired feature, and then simply forego the use of the feature if a control for the feature cannot be found.

For example, a user may prefer to have a cabin interior at 72 degrees in the summer, and 76 degrees in the winter. Or, put another way, the user may prefer to have the cabin interior at 72 degrees as long as it is at least 60 degrees outside, and at 76 degrees if it is below 60 degrees outside. In a current model, the user will commonly use "feel" to determine the exterior temperature (i.e., does the user feel hot, cold or comfortable) and then set the interior temperature accordingly, since the interior temperature is often initially within a few degrees of the exterior temperature. But, if the user is not overly uncomfortable and the user cannot quickly figure out how to operate a vehicle HVAC system, the user may simply ignore the setting change and proceed to a destination in a slightly uncomfortable manner. Or, even worse, the user may begin driving and continue fiddling with control settings as the vehicle progresses. To accommodate scenarios such as this, the illustrative embodiments allow for "triggered" portable user preferences. That is, the user can define a set of conditions and an action, once, and then any vehicle can be informed of the conditions and the action, use internal sensing capability to check for the conditions, and act in accordance with the action.

Using the same example as above, the user may configure, using a smart phone interface or even a vehicle interface, a set of conditions and an action. These settings can be saved to a portable device (the phone) or the cloud, and whenever a user enters an appropriately equipped vehicle, the configurations can be exported to the vehicle. Under the example above, the vehicle would determine the exterior temperature and automatically set the interior HVAC control without the user ever having to interact with, or even find, the actual HVAC control. This would allow a person who frequently uses a variety of vehicles short-term to simply "carry" around vehicle settings. Even upon entering a for-hire vehicle or taxi, the settings could be exported to the vehicle so the user's settings could be implemented for the duration of the drive. This could be very convenient in these instances, since the passenger often rides in the rear of the vehicle and typically cannot even reach, let alone adjust, vehicle HVAC and radio settings.

Figure 2:
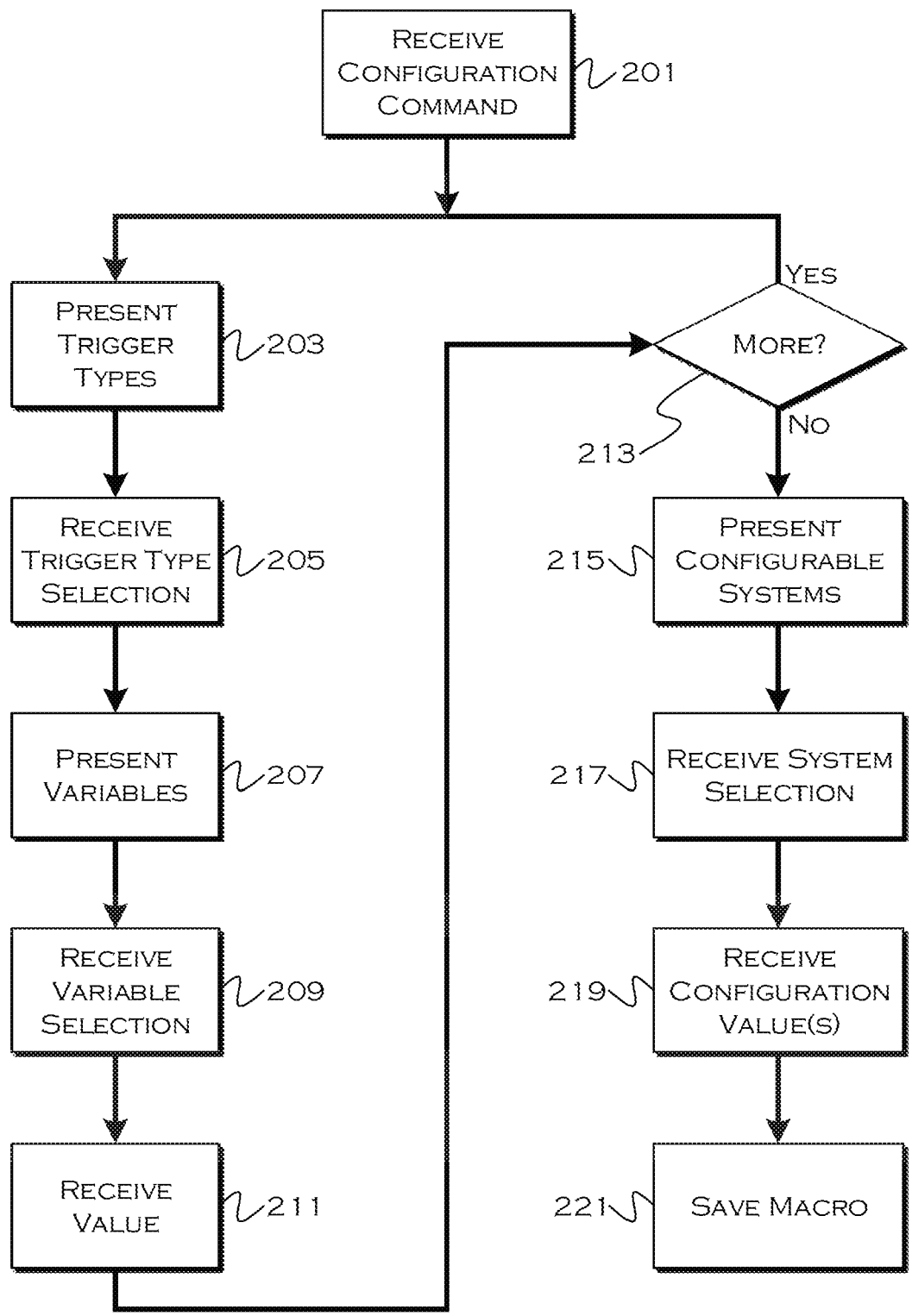
FIG. 2 shows an illustrative example of a configuration process.

FIG. 2 shows an illustrative example of a configuration process. In this example, the user could use any vehicle interface, or a phone or PC interface, to configure 201 a set of vehicle settings. In the configuration process, the user could select one or more vehicles as the basis for configuring settings, or the user could be presented with a range of all possible settings. This may matter because different vehicles have different sensing and configuration capabilities, and settings, especially those enabled by certain triggers, may not be universally portable. For the sake of the example, the model will be described as having access to all possible settings and sensors (across a manufacturer's line, for example), but it would be equally possible to limit the settings to those available in a preferred vehicle or vehicles, for example.

In this example, the process presents 203 a list of trigger types. These are trigger categories, and the user can use the categories to select specific variables within a category and configure trigger values for those variables. For example, without limitation, a trigger type could be "Weather," a variable could be "Temperature," and a value could be "72 degrees." In another example, a trigger type could be "Time," a variable could be "day of week," and a value could be "weekend." Other possible categories include, but are not limited to Connectivity States, Locations, Inputs, Occupants, etc. Some non-limiting examples of variables in these categories include Connectivity States→BT Headset Connection, Locations→point of interest proximity, Inputs→Radio Power Button Interaction, Occupants→Number of Occupants.

While the paradigm described for triggers is Type→Variable→Value, other models could also be used. The more general notion is that vehicle-detectable conditionals are usable to activate defined actions.

In the example, the user selects 205 at least one trigger type and the system presents 207 a set of configurable variables corresponding to the selected trigger type. The user then selects 209 one or more variables and the system receives user-defined values for the variables. A non-limiting list of example values, using the examples from above, is presented below for illustration only:

Weather→Temperature→<72 degrees
Time→Hour→Between 5 PM and 7 PM
Connectivity States→BT Headset Connection→Connected
Locations→point of interest proximity→<5 miles from Home POI
Inputs→Radio Power Button Interaction→Four Presses within 5 seconds
Occupants→Number of Occupants→>1

In this example, the user can continue to add conditionals as long as the user desires, to build a highly customized situation under which an action can occur. For example, the user could input all of the above examples to cause an action to occur only when the temperature was less than 72 degrees, the time was between 5 and 7 PM, a Bluetooth headset was connected, the user was less than 5 miles from home, the user pressed the radio power button four times within 5 seconds and the user was not alone in the car.

Once the user has completed building the set of conditionals, the process presents 215 configurable vehicle systems. These are systems that can be controlled or configured in response to the trigger state. These include, but are not limited to, HVAC, radio, seating, windows, horn, vehicle computers (e.g., saving something), navigation, lighting, door locks, etc. The process receives 217 user selection of one or more systems to be controlled, and receives 219 any configurable values for those systems (e.g., HVAC settings, widow height, radio settings, etc.). The system then saves a macro defining what actions to take based on what triggers are detected at what values.

Figure 3:
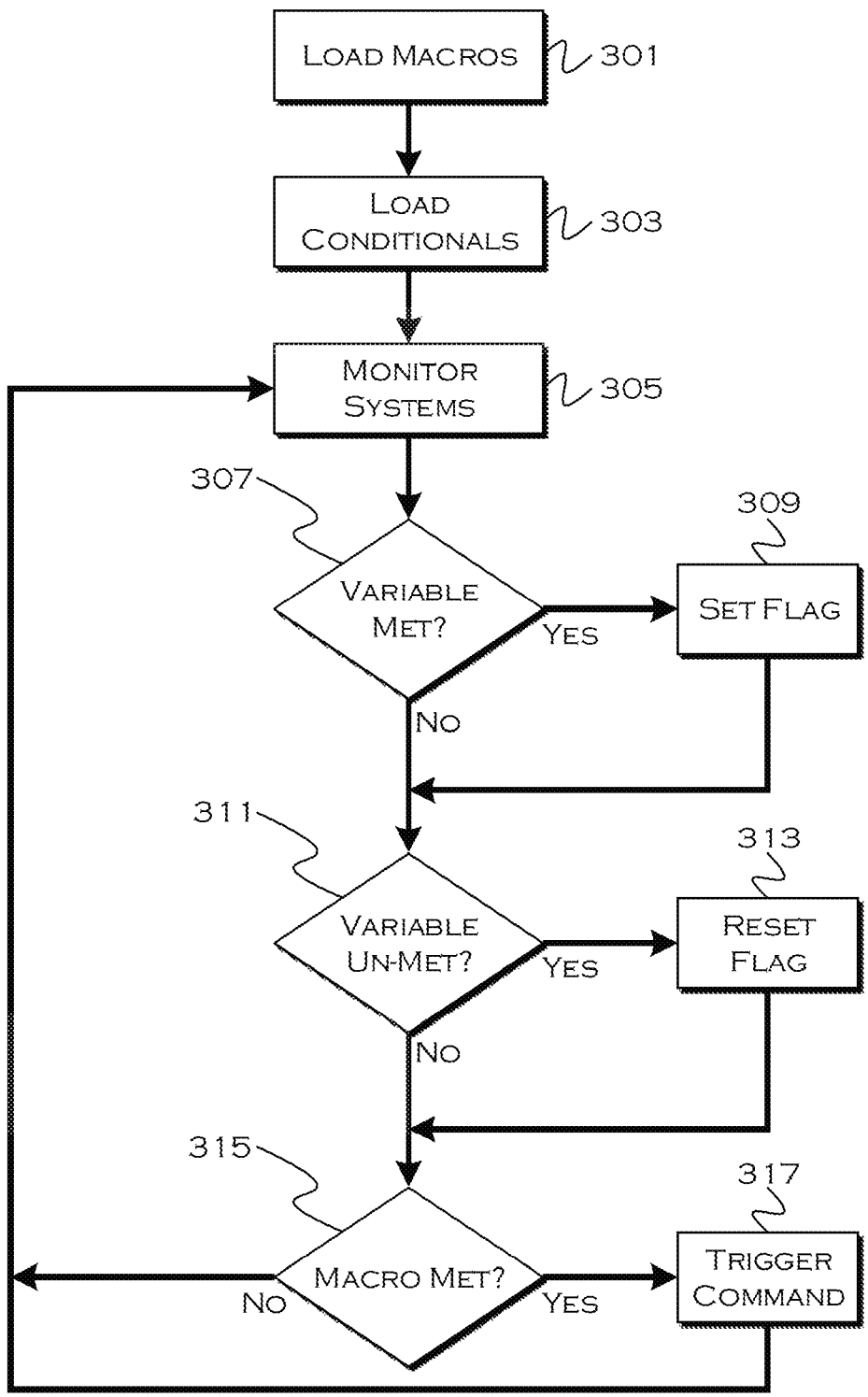
FIG. 3 shows an illustrative example of a macro execution process.

FIG. 3 shows an illustrative example of a macro execution process. In this example, the process loads 301 a set of macros associated with a user. The origin of these macros is discussed in more detail with respect to FIG. 4.

Once the user-associated macros are loaded, the system loads 303 conditionals associated with each triggerable action. For example, the system may start a process to monitor 305 temperature, monitor speed and monitor proximity to a home POI, if those are the conditions upon which one or more actions hinge. If any of the variable values are met 307 (e.g., temperature drops below 72 degrees or the vehicle is within 2 miles of a home POI), the process can set 309 a flag corresponding to meeting that conditional.

In this example, the actions are triggered by all conditionals being simultaneously met. That is, if a conditional is met, and then un-met, the process will not count that conditional as being met in perpetuity, unless the conditional was met at the same time all other required conditionals were met. In other examples, the process could simply detect meeting of each conditional at some point during a drive, and which format is chosen could also be a user configurable option.

Here, if any variable values are "un-met," 311 that is, if a previously met variable value has changed (e.g., the temperature has warmed past 72 degrees), the process resets 313 the previously set flag. Finally, the process determines 315 whether all values for a given action are met 315, and, if so, the process executes 317 the action. Otherwise, the process will continue monitoring variable values until such time as all conditions for a particular macro are met.

Figure 4:
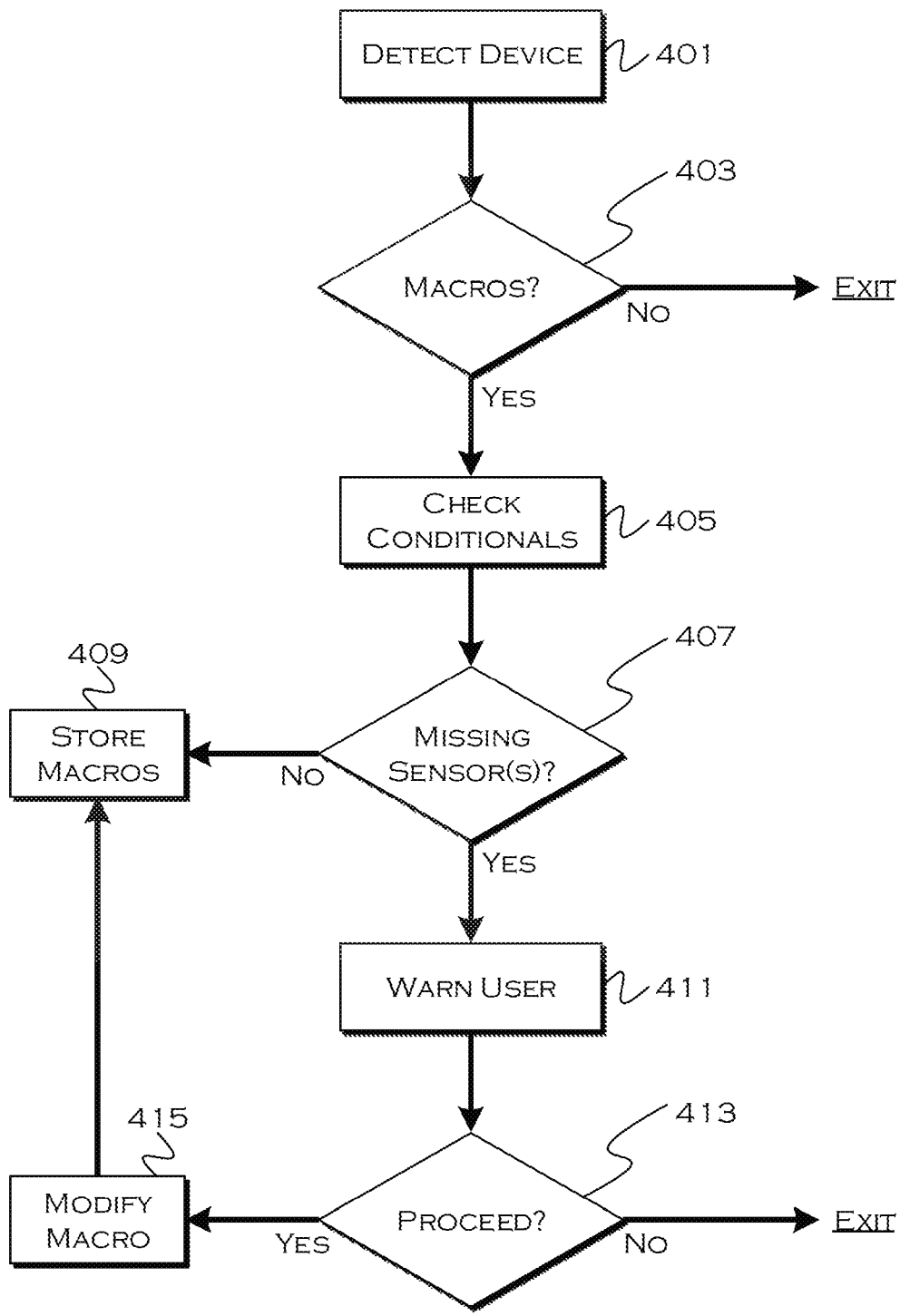
FIG. 4 shows an illustrative process allowing for macro portability.

FIG. 4 shows an illustrative process allowing for macro portability. In this example, the user configures a series of conditions and corresponding actions, and the conditions and actions can be taken in any vehicle in which the user is present, provided that sufficient monitoring capability and the configurable system exist in that vehicle. Here, the macros are stored on a portable device which can communicate with multiple vehicles (e.g., smart phone, smart watch, tablet, etc.), but in other examples the macros may be stored with respect to a user-profile located in the cloud.

In this example, the process detects 401 the presence of a connected portable device. If the device has memory capability, the process can determine 403 if the device includes any user-defined macros. Since the macros are stored on the device, the vehicle itself does not even need to know a user identity in order to implement the macros. Instead, the vehicle can determine the permissibility of macros (e.g., the macro must come from a device running a ride-sharing application, a driver must approve macro-loading, etc) and merely load the macros without ever knowing a user identity. In a cloud-based model, where the macros are stored with respect to a user profile, the process may need to know a user-ID (obtainable from the device) or a device ID associated with the user profile in the cloud.

Since the macros have conditionals associated therewith, the vehicle will need to be able to detect those conditionals in order to ensure that all conditions for triggering the action are met. The vehicle can check 405 the conditionals associated with each macro and determine 407 if any sensing capability needed to verify the conditional is lacking.

If all the appropriate sensing is available, the process can locally store 409 the macros for execution when the appropriate conditions are met. If any sensing capability is lacking, the process can either ignore those macros, or, for example, can warn 411 a user that a macro will execute based on a sub-set of conditionals. If the user elects to proceed 413 in the absence of a sensor, the process can temporarily modify 415 the macro and store the modified macro. For example, if the vehicle lacked a rain sensor, and there was a conditional to play moody music when the vehicle was traveling under 35 mph and in rain, the new macro would activate simply when the vehicle was traveling under 35 mph.

The user could also save the temporary modification, save the modification with respect to a specific vehicle or class/make/model of vehicle, or discard the modification when a drive ended.

Certain applications could also have configurable macros associated therewith. For example, a ride-hailing application could have a subset of configurable features granted automatic permission for execution when a ride hailed through the application arrived. These features could be unlocked for the duration of a ride, and the locally stored macros could be deleted when a ride ended. This allows users hailing a vehicle to dynamically configure riding experiences. In another example, a ride-sharing application may have similar functionality, unlocking the features for the duration of a rental, for example. The system could then revert to stock settings in the latter case, and to the driver preferences in the former case. In some of these instances, the user may be limited in what features could be controlled, but this would allow a user to enter any short-term used vehicle and have the vehicle responsively configure as though the user were in active control of the configurable systems.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A computer-implemented method comprising: connecting to a vehicle computer via a mobile device;
wirelessly requesting, via the mobile device, vehicle system data corresponding to a plurality of vehicle system states, the vehicle system data saved on the mobile device in conjunction with a user-defined vehicle-enactable action;
comparing, via the mobile device, the state data for each of the plurality of vehicle system states to user-defined system state parameters, the parameters saved as a trigger for enacting the vehicle-enactable action;
wirelessly instructing, from the mobile device, the vehicle computer to enact the vehicle-enactable action when the state data matches the parameters for all of vehicle system states based on the comparing;
receiving an error message responsive to the requesting, indicating that vehicle system state data is unavailable for at least one of the plurality of vehicle system states; and
modifying the trigger to exclude the parameters corresponding to the unavailable data.

2. The method of claim 1, wherein the vehicle system data includes at least a time of day.

3. The method of claim 1, wherein the vehicle system data include at least a current temperature.

4. The method of claim 1, wherein the vehicle system data includes a specific series of vehicle input button interactions.

5. The method of claim 1, wherein the vehicle system data includes a location-related state value.

6. The method of claim 1, wherein the modifying further includes modifying the trigger responsive to a user-instruction to modify the trigger.

7. The method of claim 1, wherein the vehicle-enactable action includes changing a vehicle system setting to match a user-defined system setting saved on the mobile device.

* * * * *